July 25, 1944.  C. E. MAPPES ET AL  2,354,394
BLACKOUT LAMP
Filed July 17, 1942
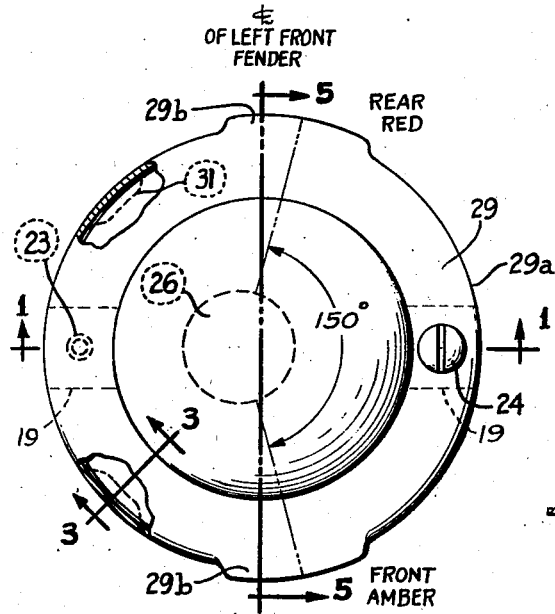
Fig. 2
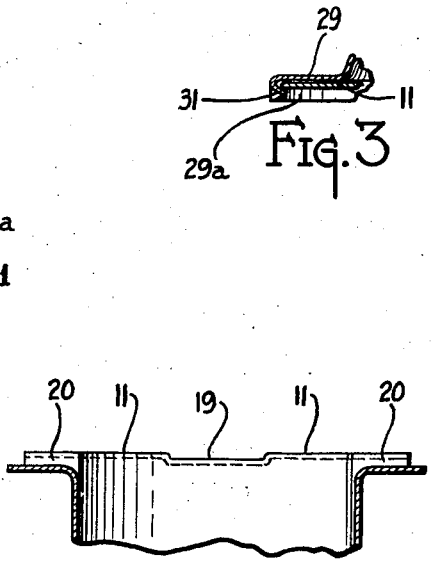
Fig. 3
Fig. 5
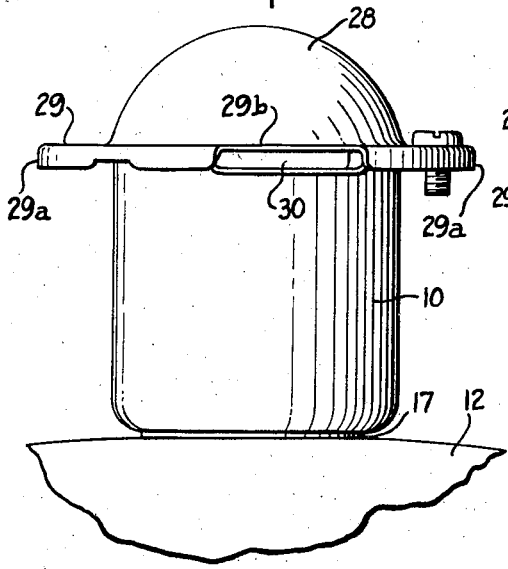
Fig. 4
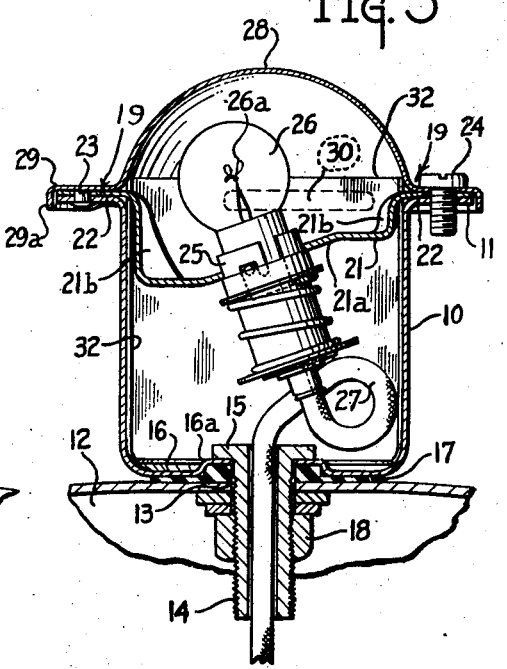
Fig. 1
INVENTORS
CHARLES E. MAPPES &
WILLIAM C. WOOTTON
BY
ATTORNEYS Patented July 25, 1944

2,354,394

UNITED STATES PATENT OFFICE 2,354,394

BLACK-OUT LAMP

Charles E. Mappes and William C. Wootton, Cincinnati, Ohio

Application July 17, 1942, Serial No. 451,256

4 Claims. (Cl. 240—8.22)

This invention relates to automobile lighting, more particularly to a parking light for use on automobiles during a blackout.

In a blackout in which all artificial sources of light are extinguished, particularly those which emanate light which would be visible to hostile aircraft, a problem arises in regulating necessary traffic especially moving vehicles such as fire trucks and the like. Carefully guarded lights having a very small area and whose emanation of light rays have been limited to a small angular dispersion especially in the vertical plane, have been used both on moving vehicles and on parked vehicles to give sufficient light to guide traffic and yet not enough to be visible to a hostile aircraft overhead. The present invention relates to a parking light which will indicate the position of a parked vehicle so that a moving vehicle will be guided thereby to prevent a collision.

It is therefore a principal object of this invention to provide a parking light for use on vehicles in which the light dispersion is limited in the vertical plane to a very small angle, and in the horizontal plane to a relatively large angle of dispersion.

It is a further object of this invention to provide a parking light for use on vehicles during a blackout in which a low intensity light with a small area is utilized to disperse light in a vertical plane with a very small angle of dispersion and in a horizontal plane with a relatively large angle of dispersion.

It is a further object of this invention to provide a parking light to be positioned on the left front fender of an automobile, having small horizontal slots provided with hooded portions to project colored light both in a forward and rearward direction to indicate to moving traffic during a blackout the parked position of the automobile.

It is a further object of this invention to provide a blackout parking light, which is simply constructed, readily manufactured and easily applied to a vehicle on which it is to be used.

Other objects and advantages of this invention relating to the arrangement, operation and function of the related elements of the structure, to various details of construction, to combinations of parts and to economies of manufacture, will be apparent to those skilled in the art upon consideration of the following description and appended claims; reference being had to the accompanying drawing forming a part of this specification wherein like reference characters designate corresponding parts in the several views.

Fig. 1 is a cross-sectional elevation of a light embodying the invention.

Fig. 2 is a plan view, partly cut away.

Fig. 3 is a detail taken along line 3—3 of Fig. 2.

Fig. 4 is an elevation showing the light in operative position on the fender of an automobile.

Fig. 5 is a cross-sectional elevation of the lip of the cup.

Referring to the drawing particularly to Fig. 1, a cup-like container 10 is provided having an open upper end, which is provided with an outwardly-extending flange 11 on its lip. When the container is in normal operating position on an automobile fender 12 as shown in Fig. 4, the flange 11 is substantially horizontal. An aperture 13 is provided in the fender 12, through which extends a hollow bolt 14 whose head 15 contacts the bottom 16 of the container 10, a boss 16a may be provided in the bottom 16 if desired. A resilient pad 17 is provided between the bottom 16 and the fender 12, to embrace the bolt 14 to prevent rattling when nut 18 is pulled up and tightened to mount the lamp in position on the fender 12.

The outwardly-extending flange 11 is provided with two sets of depressions, one set 19 being relatively shallow and positioned in diametrically-opposed relation as shown in Fig. 1, while the second set 20 are relatively deep, being positioned about 150° apart symmetrically with the axis of the first set of depressions 19 and facing outwardly substantially along the longitudinal axis of the fender. The shallow set of depressions 19 are used to position a bridge 21, having ears 22 which fit into the depressions and are attached thereto by a rivet 23, and a screw 24 which has a further function to be set forth hereinafter.

The bridge 21 is provided with an apertured central portion 21a which is inclined at an angle to the horizontal, and supported by webs 21b connected to the ears 22. The apertured central portion 21a has a bulb socket 25 positioned therein, attached thereto in a well known manner which need not be described in further detail. A bulb 26 is positioned in the socket by a bayonet slot arrangement as is well known in the art. Electrical contact is made through the socket by a pig tail connection 27 which issues from the bottom of the socket, is looped and extends through the hollow bolt 14 to the inner side of the fender where connection is made with the electrical circuits of the vehicle on which the lamp is mounted. The return is made through a grounded portion of the socket 25.

A dome-shaped cover 28 is provided to cooperate with the container 10 to form an enclosure for the lamp bulb 26. The cover is provided with a horizontal peripheral flange 29, which overlies in parallel relation the outwardly-extending flange 11, the flange 29, being provided with a depending portion 29a to cover the joint between the flanges to prevent light leakage. Those portions of the flange 29 which overlie the depressions 20 in the flange 11 are not bent downwardly to provide the depending portion 29a, but are left extended outwardly as is clearly shown at 29b in Figs. 2 and 4, so elongated slots 30 are defined between the flange 29 and the depressions 20 in the flange 11. The slots 30 are defined on the lower side by the depressions 20 in the outwardly extending flange 11, and on the upper side by the lower surface of the flange 29 on the cover 28. The only light which issues from the enclosure when the bulb 26 is lighted, passes through slots 30 in the predetermined directions controlled by their positions in the enclosure.

To attach the dome-shaped cover member 28 to the container 10, a pair of inturned ears 31 are provided on the lower edge of depending flange 29a disposed symmetrically approximately 120° from an aperture in flange 29 through which screw 24 (hereinbefore described) extends to thread into ear 22 and flange 11, to hold the parts firmly together. Before the screw 24 is threaded into position, the inturned ears 31 are positioned to embrace the edge of flange 11 as shown in Figs. 2 and 3 so as to hold the portion of the cover 28, distal from screw 24 in close relation with the enclosure. This provides a means whereby one screw is used to hold the cover in position and prevents the cover 28 from being improperly positioned on the container.

Inasmuch as the slots 30 are defined by walls having a tubular conformation the angular dispersion of light issuing from the slots is limited particularly in a vertical direction. Light on horizontal angles will be visible only to persons coming toward the front or rear of the car in line with the center line of the left front fender, or slightly outwardly therefrom. Otherwise a person approaching the car cannot see any light. To further prevent upward dispersion, the light bulb, particularly the concentrated light source of the light bulb such as filament 26a is disposed above a horizontal plane passing through slots 30, directed forwardly and rearwardly so that most of the light visible through the slots in a horizontal plane will be derived from reflection from the inner walls of the container rather than direct radiation from the light source. To reduce reflection on the interior of the enclosure to a minimum, the inner surface of the enclosure may be painted a dead black.

Color screens 32 are preferably provided to cooperate with slots 30 so that the light issuing therefrom is given a proper color suitable to indicate the position of the car. For example an amber screen may be used over the slot disposed in a forward direction with reference to the car, while a red screen may be positioned over the slot disposed rearwardly of the car. The screens may conveniently be in sheet form and of such length as to fit snugly on the interior of the enclosure between the ears 21b of the bridge 21, and also of such height as to extend from the bottom 16 to the dome of the cover 28, so that screen 32 is pressed downwardly when the cover 28 is fitted into position. In this way, the screens are firmly held in position and may not be displaced even though exposed to severe vibration.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed is:

1. In a signalling device for a vehicle, a cuplike opaque enclosure adapted to be mounted by its base on a fender of the vehicle, having an aperture in its base aligned with an aperture in the fender to place the interior of the enclosure in communication with the interior of the fender, an electric light source in the enclosure, an opaque cap positioned on the lip of the enclosure forming a weatherproof connection therewith, a bridge member crossing the enclosure adapted to hold the light source in a predetermined position in the enclosure, means to hold the cap and the bridge member in position on the enclosure, a plurality of elongated horizontal slots formed between the lip of the enclosure and the cap below the light source to disseminate light forwardly and rearwardly of the vehicle with small angular dispersion of light in a vertical plane, and conducting means in electric circuit with the light source entering the enclosure via the aligned apertures of the fender and the enclosure.

2. In a signalling device for a vehicle, a cuplike opaque enclosure adapted to be mounted by its base on the left front fender of the vehicle, having an aperture in its base aligned with an aperture in the fender to place the interior of the enclosure in communication with the interior of the fender, an electric light source in the enclosure, an opaque cap positioned on the lip of the enclosure forming a weatherproof connection therewith, a bridge member crossing the enclosure adapted to hold the light source in a predetermined position in the enclosure, means to hold the cap and the bridge member in position on the enclosure, a plurality of elongated horizontal slots formed between the lip of the enclosure and the cap below the light source to disseminate light forwardly and rearwardly of the vehicle with small angular dispersion of light in a vertical plane, colored light screens of appropriate color positioned in the slots to disseminate warning lights, and conducting means in electric circuit with the light source entering the enclosure via the aligned apertures of the fender and the enclosure.

3. In a signalling device for a vehicle, a cuplike opaque enclosure adapted to be mounted by its base on the left front fender of the vehicle, having an aperture in its base aligned with an aperture in the fender to place the interior of the enclosure in communication with the interior of the fender, an electric light source in the enclosure, an opaque cap removably positioned on the lip of the enclosure forming a weather and light-proof connection therewith, a bridge member crossing the enclosure adapted to hold the light source in a predetermined position in the enclosure, means to removably hold the cap in position on the enclosure, a plurality of elongated horizontal slots formed between the lip of the enclosure and the cap below the light source to disseminate light forwardly and rearwardly of the vehicle with small angular dispersion of light in a vertical plane, colored light screens of appropriate color positioned in the slots to disseminate warning lights, and conducting means in electric circuit with the light source entering the enclosure via the aligned apertures of the fender and the enclosure.

4. In a signalling device for a vehicle, a cup-like opaque enclosure adapted to be mounted by its base on the left front fender of the vehicle, having an aperture in its base aligned with an aperture in the fender to place the interior of the enclosure in communication with the interior of the fender, an electric light source in the enclosure, an opaque cap removably positioned on the lip of the enclosure forming a weather and light-proof connection therewith, a bridge member crossing the enclosure adapted to hold the light source in a predetermined position in the enclosure, means to removably hold the cap in position on the enclosure, a plurality of elongated horizontal slots formed between the lip of the enclosure and the cap below the light source to disseminate light forwardly and rearwardly of the vehicle with small angular dispersion of light in a vertical plane, colored light screens of appropriate color positioned in the enclosure cooperating with the bridge member to cover the slots and color the disseminated light to create a warning signal, and conducting means in electric circuit with the light source entering the enclosure via the aligned apertures of the fender and the enclosure.

WILLIAM C. WOOTTON.
CHAS. E. MAPPES.